US008630064B2

(12) United States Patent
Maeda et al.

(10) Patent No.: US 8,630,064 B2
(45) Date of Patent: Jan. 14, 2014

(54) MAGNETIC WRITE HEAD WITH NOVEL SHIELD STRUCTURE HAVING LATTERALLY EXTENDING TRAILING GAP LAYER AND CONCAVED SIDE GAP

(75) Inventors: Maki Maeda, Hiratsuka (JP); Kimitoshi Eto, Odawara (JP); Hiromi Shiina, Hitachi (JP); Kazue Kudo, Odawara (JP); Masafumi Mochizuki, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 132 days.

(21) Appl. No.: 13/294,816

(22) Filed: Nov. 11, 2011

(65) Prior Publication Data

US 2013/0120876 A1    May 16, 2013

(51) Int. Cl.
   *G11B 5/11*      (2006.01)
   *G11B 5/187*     (2006.01)

(52) U.S. Cl.
   USPC .................................. 360/125.3; 360/119.04

(58) Field of Classification Search
   USPC ............. 360/125.03, 125.04, 125.06, 125.12, 360/125.13, 125.3, 125.71, 119.02, 119.03, 360/119.04
   See application file for complete search history.

(56) References Cited

U.S. PATENT DOCUMENTS

| | | | |
|---|---|---|---|
| 7,239,478 B1 | 7/2007 | Sin et al. | |
| 7,467,461 B2 | 12/2008 | Bonhote et al. | |
| 7,551,396 B2 | 6/2009 | Hsu et al. | |
| 7,609,479 B2 | 10/2009 | Sasaki et al. | |
| 7,712,206 B2 | 5/2010 | Jiang et al. | |
| 7,869,160 B1 | 1/2011 | Pan et al. | |
| 8,347,489 B2 * | 1/2013 | Hong et al. | 29/603.16 |
| 2005/0219764 A1 * | 10/2005 | Kameda et al. | 360/313 |
| 2007/0115584 A1 | 5/2007 | Balamane et al. | |
| 2008/0068747 A1 * | 3/2008 | Sasaki et al. | 360/110 |
| 2008/0278861 A1 | 11/2008 | Jiang et al. | |
| 2009/0168240 A1 | 7/2009 | Hsiao et al. | |
| 2010/0007996 A1 | 1/2010 | Iwasaki et al. | |
| 2010/0157472 A1 | 6/2010 | Hsiao et al. | |
| 2010/0188783 A1 | 7/2010 | Taguchi | |
| 2010/0302680 A1 | 12/2010 | Hirata et al. | |
| 2010/0321835 A1 | 12/2010 | Zhang et al. | |
| 2011/0007428 A1 | 1/2011 | Batra et al. | |
| 2011/0146062 A1 * | 6/2011 | Allen et al. | 29/603.18 |
| 2011/0205671 A1 * | 8/2011 | Benakli et al. | 360/319 |
| 2012/0281314 A1 * | 11/2012 | Lopusnik et al. | 360/125.03 |

FOREIGN PATENT DOCUMENTS

| | | |
|---|---|---|
| JP | 2010/108533 A | 5/2010 |
| JP | 2010/176732 | 8/2010 |

\* cited by examiner

*Primary Examiner* — Jefferson Evans
(74) *Attorney, Agent, or Firm* — Zlika-Kotab, PC

(57) ABSTRACT

A magnetic write head having a gap structure that improves write head performance. The write head includes a magnetic write pole and a magnetic shield that is separated from the trailing edge of the write pole by a non-magnetic trailing gap layer and is separated from the sides of the write pole by non-magnetic side gap layers. The trailing gap extends laterally beyond the side gap layers, and a convex bump is formed at an edge of the magnetic shield at a location near the trailing end of each of the side gap layers.

19 Claims, 34 Drawing Sheets

MAGNETIC WRITE HEAD WITH NOVEL SHIELD STRUCTURE HAVING LATTERALLY EXTENDING TRAILING GAP LAYER AND CONCAVED SIDE GAP

FIELD OF THE INVENTION

The present invention relates to perpendicular magnetic recording and more particularly to a perpendicular magnetic write head with a novel wrap-around shield structure for improved signal to noise ratio.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

At very small bit size and high data density it becomes ever more important to minimize adjacent track interference and to maximize the signal to noise ratio (SNR) of the recording system. Adjacent track interference refers the inadvertent affect on an adjacent track of data when recording to an intended data track. The signal to noise ration refers the ratio of the actual data signal to be read from the disk relative to the inadvertent signal noise in the system.

SUMMARY OF THE INVENTION

The present invention provides a magnetic write head that includes a magnetic write pole having a trailing edge, a leading edge and first and second laterally opposed sides each extending from the leading edge to the trailing edge. A magnetic shield is separated from each of the first and second laterally opposed sides of the magnetic write pole by first and second non-magnetic side gap layers and separated from the trailing edge of the magnetic write pole by a non-magnetic trailing gap layer. The non-magnetic trailing gap layer extends laterally beyond the first and second sides of the write pole and laterally beyond the non-magnetic side gap layer, and the magnetic shield has first and second convex bumps each of the convex bumps being located at a junction between one of the non-magnetic side gap layers and the trailing gap layer.

The invention is, therefore, characterized by a shield structure in which a third gap is provided between the trailing shield and the side shield in the region of the main pole of the recording head. The third gap is present between the trailing shield gap between the trailing shield and the side shield. This is in addition to the trailing shield gap between the main pole and the trailing shield and the side shield gap between the main pole and the side shield. The shield is formed with a convex bump, which is located at a junction between the side shield and trailing shield (near the trailing end of the side shield). This bump advantageously improves the performance of the write head.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
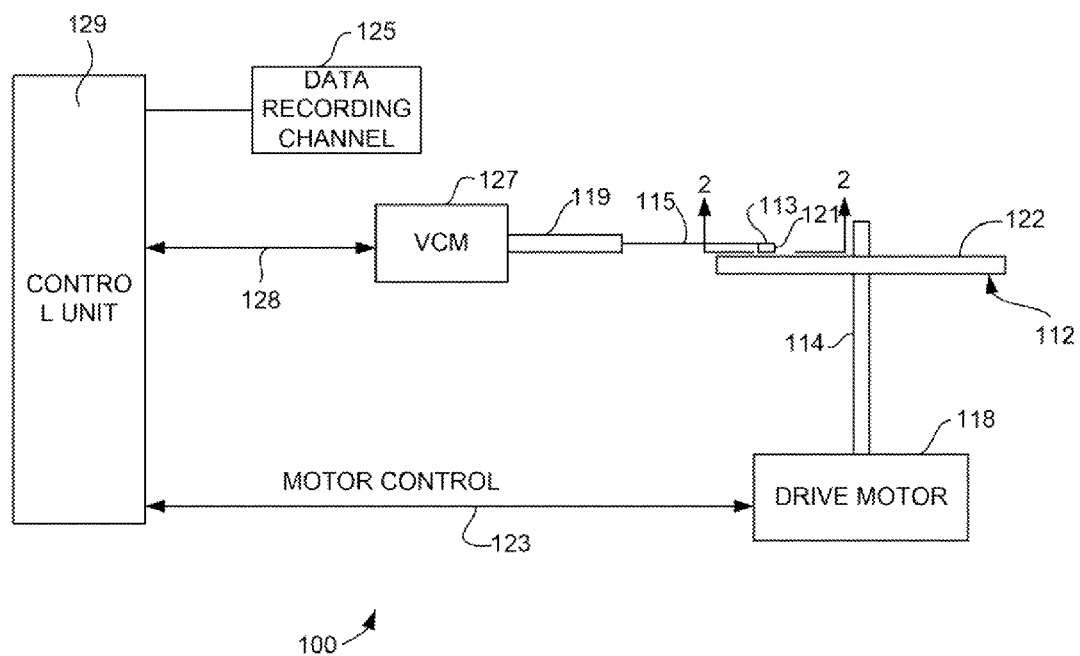
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly, above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
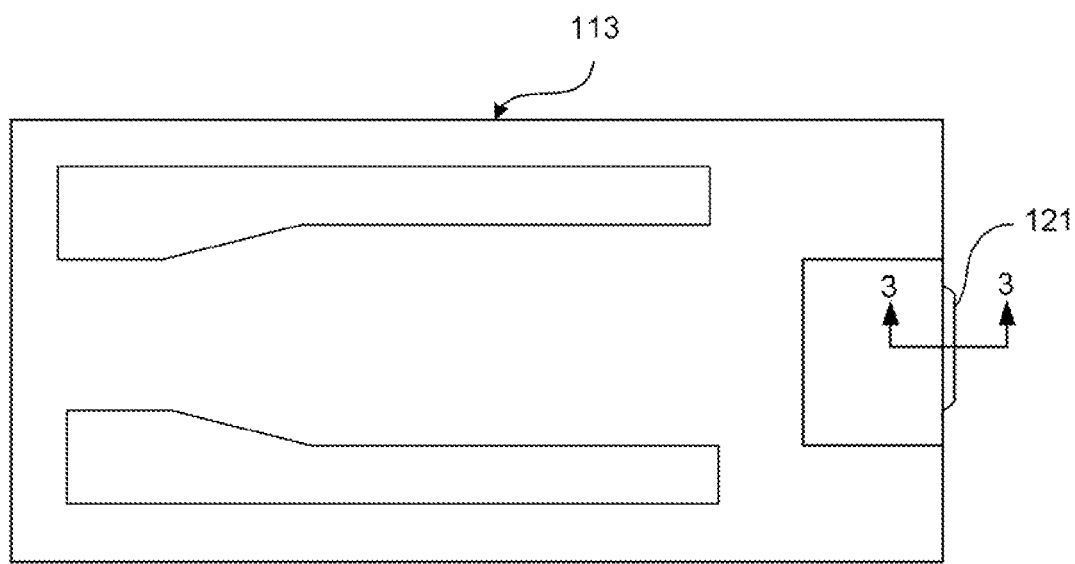
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
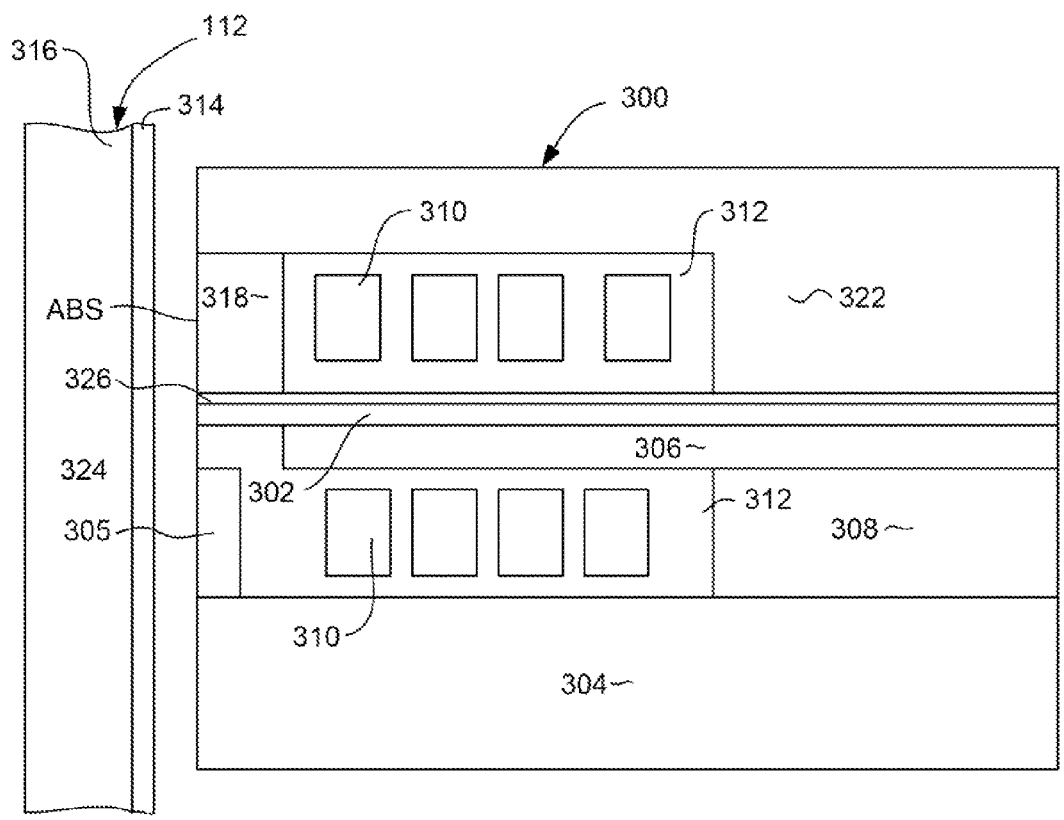
FIG. 3 is a cross sectional view of a magnetic head, taken from line 3-3 of FIG. 2 and rotated 90 degrees counterclockwise, of a magnetic head according to an embodiment of the present invention.

FIG. 3 is a side cross sectional view of a magnetic write head 300 that can be constructed by a method of the present invention. The write head 300 includes a magnetic write pole 302 and a magnetic return pole 304. The magnetic write pole 302 can be connected with a magnetic shaping layer 306 that helps to conduct magnetic flux to the tip of the write pole 302. The write pole 302 and shaping layer 306 can be connected with the magnetic return pole 304 by a magnetic back gap structure 308. A non-magnetic, electrically conductive write coil 310 passes between the return pole 304 and the write pole and shaping layer 302, 306, and may also pass above the write pole and shaping layer 302, 306. The write coil 310 can be encased in a non-magnetic, electrically insulating material 312, which can be a material such as alumina and/or hard baked photoresist. When an electrical current flows through the write coil 310, a magnetic field is induced around the coil 310 that results in a magnetic flux flowing through the return pole 304, back gap layer 308, shaping layer 306 and write pole 302. This results in a write field being emitted from the tip of the write pole 302. This strong, highly concentrated write field locally magnetizes a magnetic top layer 314 of the magnetic media 112. The magnetic field then travels through a soft magnetic under-layer 316 of the magnetic media before returning to the return pole 304, where it is sufficiently spread out and weak that it does not erase the previously recorded bit of data. The write head 300 can also include a magnetic pedestal 305, at the ABS that acts as a shield to prevent stray fields, such as those from the write coil 310 from reaching the magnetic medium 112.

The write head 300 also includes a trailing magnetic shield 318, located at the air bearing surface (ABS) and separated from the write pole 302 by a non-magnetic trailing gap layer 326. The trailing magnetic shield 318 can be connected with the other magnetic structures at the back of the write head 300 by a trailing magnetic pole 322.

Figure 4:
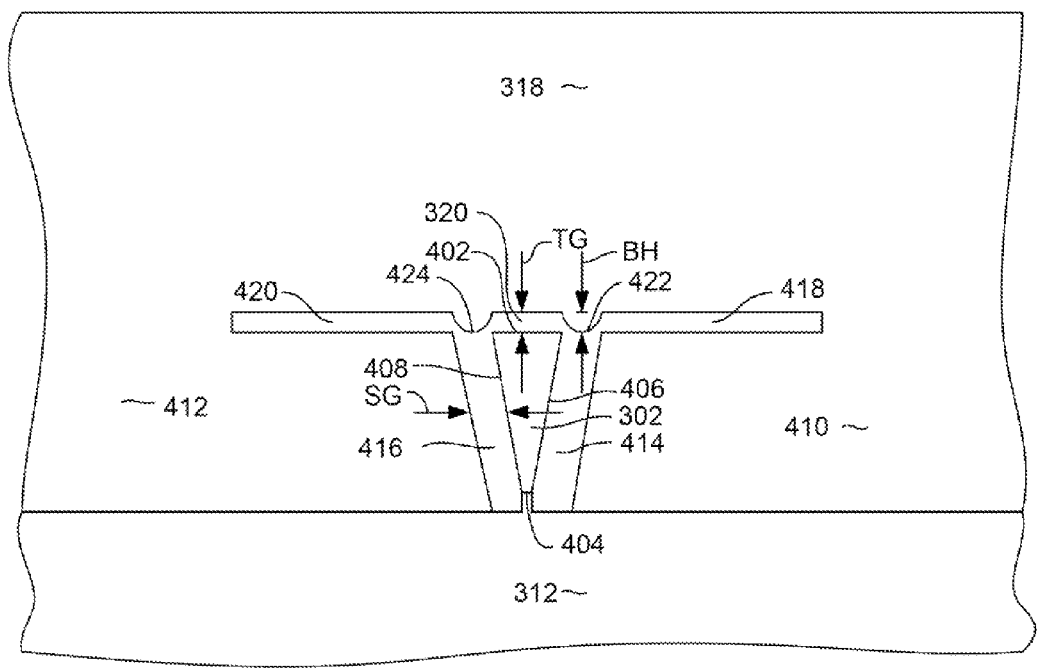
FIG. 4 is an ABS view of a portion of the magnetic write head of FIG. 3.

FIG. 4 shows a view of the write pole 302 as seen from the Air Bearing Surface (ABS). As can be seen, the write pole 302 has a trailing edge 402, a leading edge 404, and first and second laterally opposed sides 406, 408 that each extend from the trailing edge 402 to the leading edge 404. Also as can be seen, the first and second sides 406, 408 are preferably tapered so that the write pole 302 is wider at the trailing edge 402 than it is at the leading edge 404.

The shield 318 extends down to provide side shield portions 410, 412, which are separated from the sides 406, 408 of the write pole 302 by non-magnetic side gap layers 414, 416 that define a side gap length (SG). The trailing edge 402 of the write pole 302 is separated from the trailing shield 318 by the non-magnetic trailing gap layer 320, described previously with reference to FIG. 3 that defines a trailing gap length TG. As can be seen, the head 300 also includes non-magnetic gap extensions 418, 420 that extend laterally outward. In the embodiment shown in FIG. 4 these gap extensions extend laterally outward from the trailing gap 320, and can be considered to be extensions of the trailing gap. In addition, as seen in FIG. 4, the gap structure 320, 418, 420 includes notches located at the top of the side gaps 414, 416. These notches result in first and second convex bump structures 422, 424 formed in the trailing shield 318. These convex bump structures 422, 424 are located near the top (trailing most portion) of the side gaps 414, 416 and extend in a leading direction as shown. Each of the convex notches has a bump height (BH) measured from the leading edge 422 of the trailing portion of the trailing shield 318. The advantages and configuration of these structures 418, 420, 422, 424 are described in greater detail herein below.

In order to achieve narrower tracks in a hard disk drive, it has become more important to increase not only the Signal to Noise Ratio (SNR) in the track center, but also to suppress erasure in adjacent tracks and to increase the SNR at the track ends. An effective way of improving these two points involves reducing the leakage field to the adjacent tracks by providing side shields on both sides of the recording head, while also narrowing the gap with the side shields in order to increase the field gradient. Japanese Patent Abstract JP2010-176732A describes a write head having a side shield structure that forms a narrow gap at the trailing edge of the write pole and a wide gap structure on the leading edge of the write pole. This is done with the aim of reducing the leakage write field to the adjacent tracks without reducing write field. In the structure shown in FIG. 4, the side shield portions 410, 412 further help to prevent adjacent track interference. The non-magnetic side gaps 414, 416 are preferably made thicker than the trailing gap 320 to prevent the loss of write field to the side shield portions 410, 412.

The present invention provides a structure for a recording head that provides a high Signal to Noise Ratio (SNR) in a high data density disk drive device, and also provides method for constructing such a write head, as will be described further below. In order to achieve a high SNR in a narrow-track disk drive, it is necessary to increase the write head field gradient at the track ends. This means that the magnetic flux has to be concentrated closer to the trailing edge of the main pole than the other portions of the write pole 320. The presence of the trailing shield 318 achieves the increase in field gradient by attracting magnetic write field toward the trailing edge 402 of the write pole 302.

Figure 5:
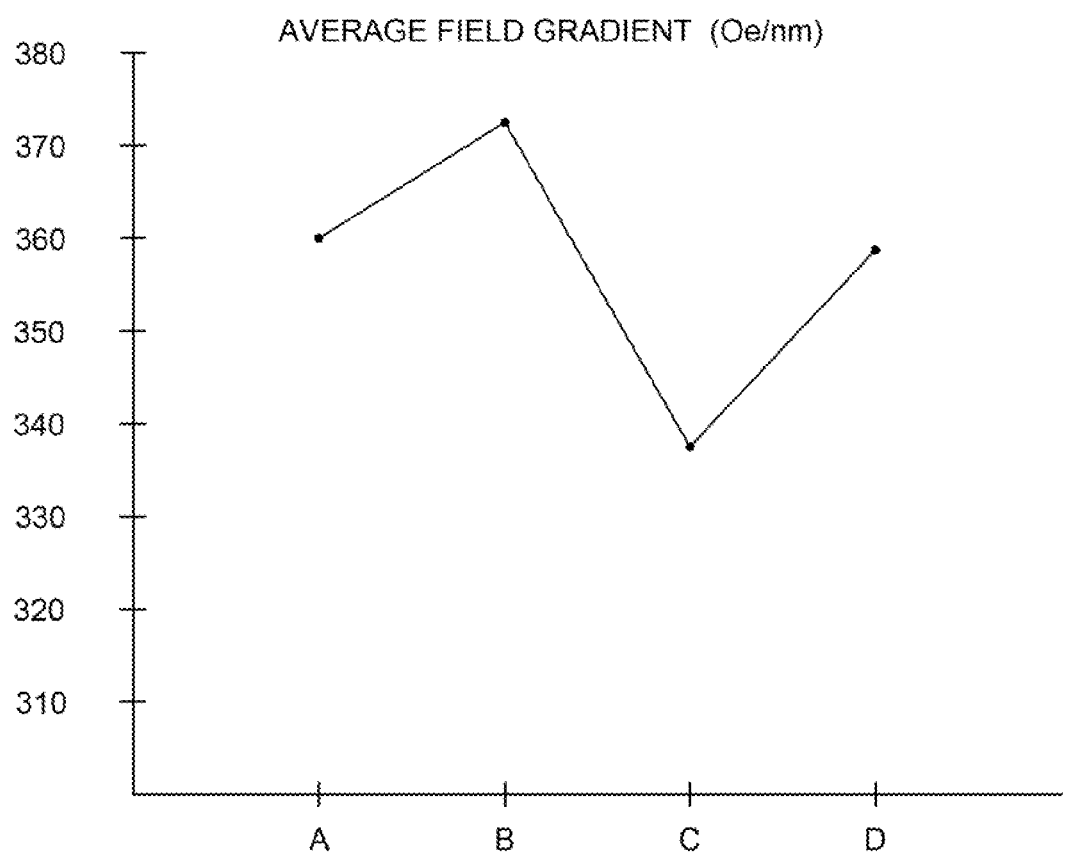
FIG. 5 is graph of write field gradient for various magnetic write head configurations at a first side gap length.
Figure 6:
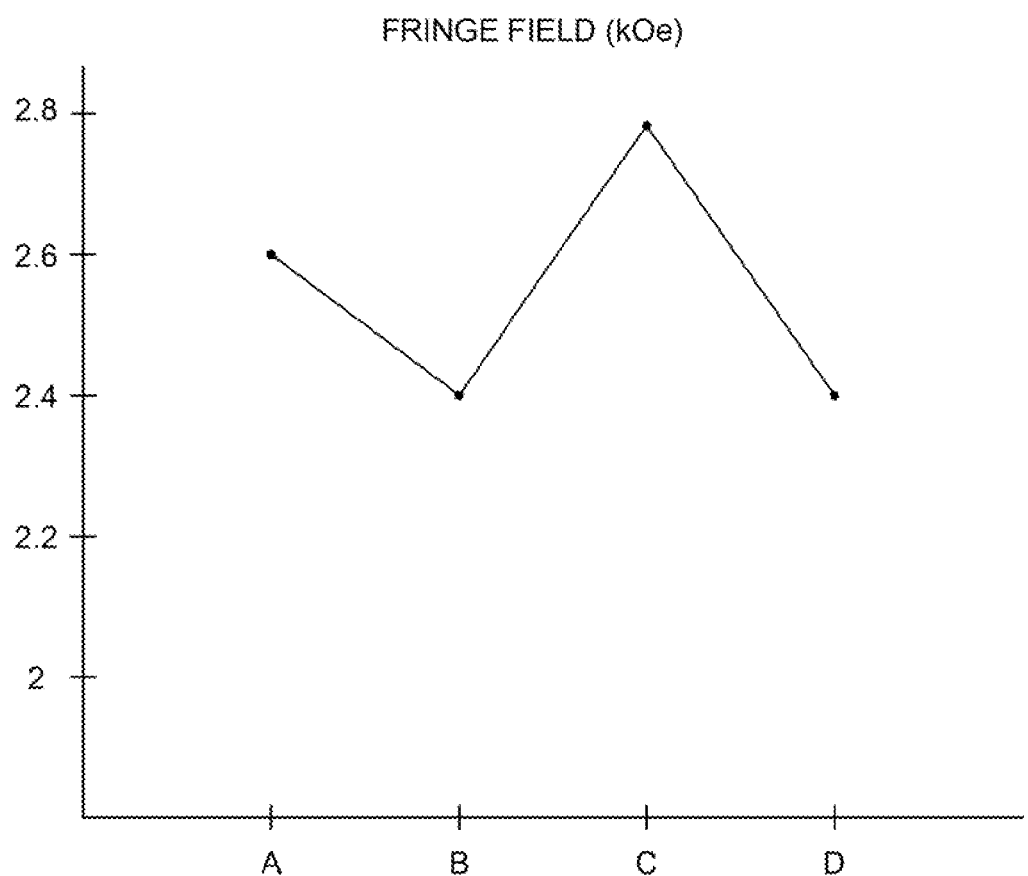
FIG. 6 is a graph of fringing field for various magnetic write head configurations at the first side gap length.
Figure 7:
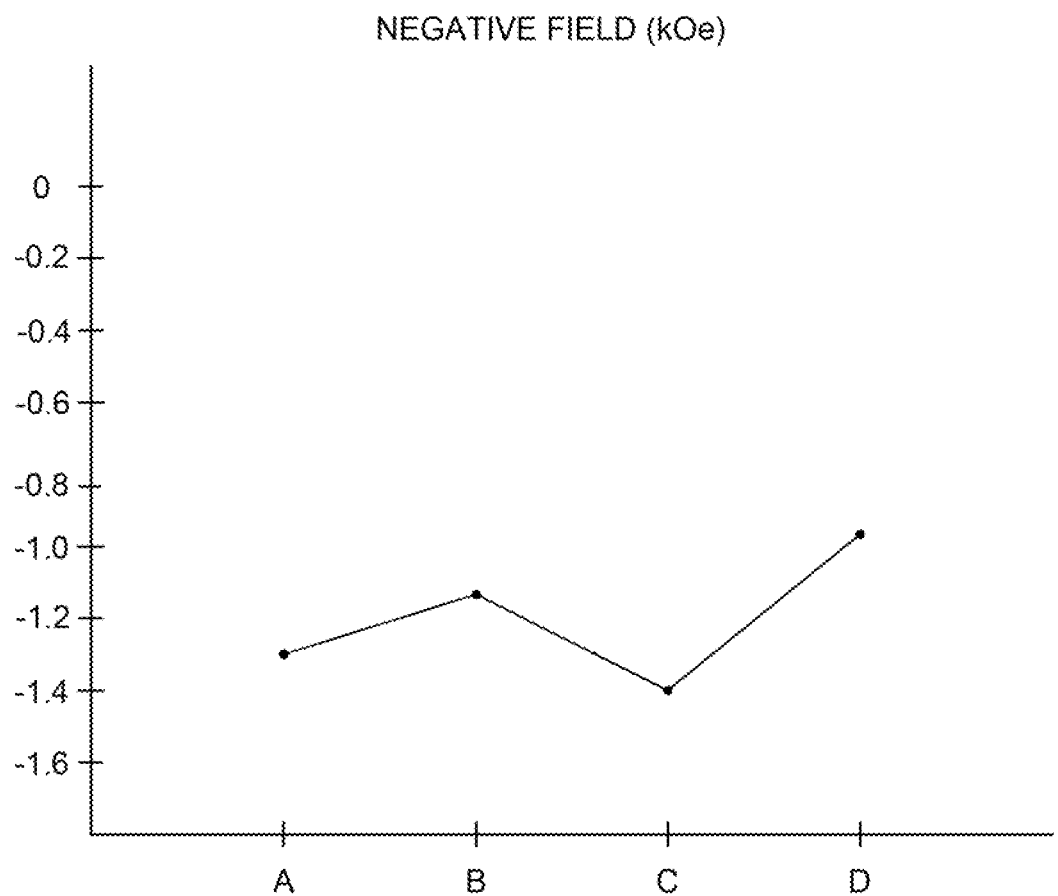
FIG. 7 is a graph of negative field for various magnetic write head configurations at the first side gap length.
Figure 8:
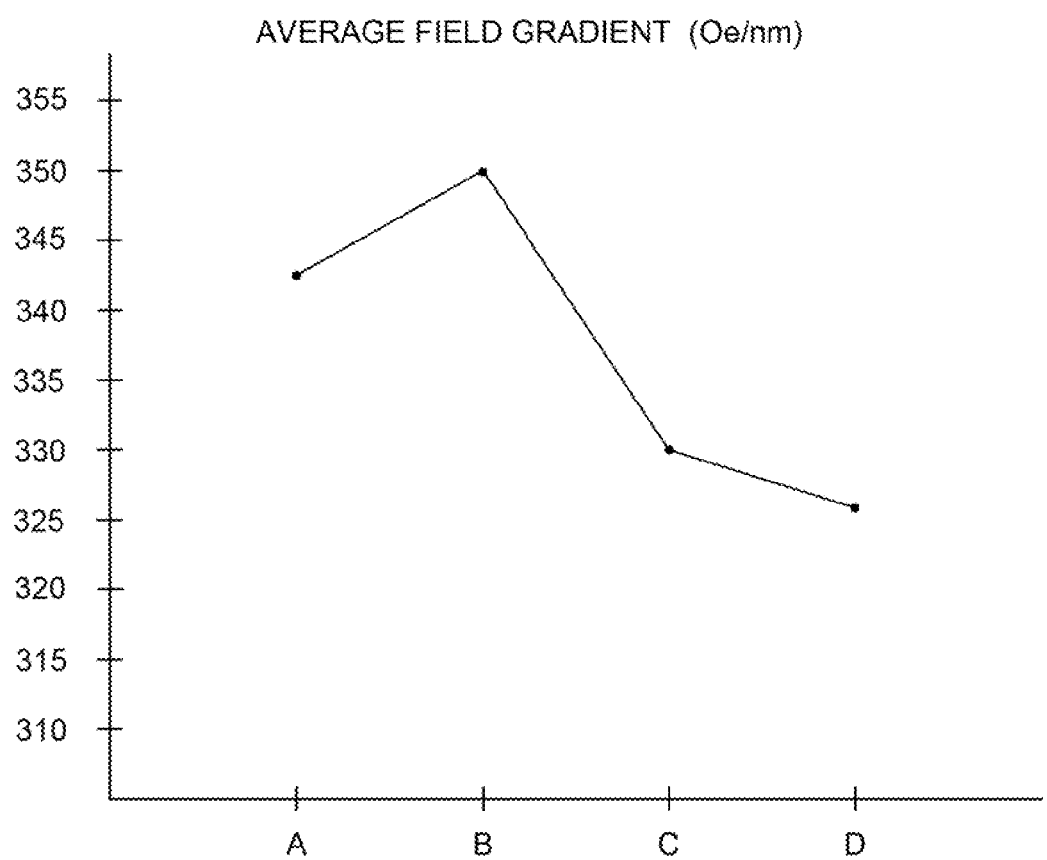
FIG. 8 is a graph of write field gradient for various magnetic write head configurations at a second side gap length.
Figure 9:
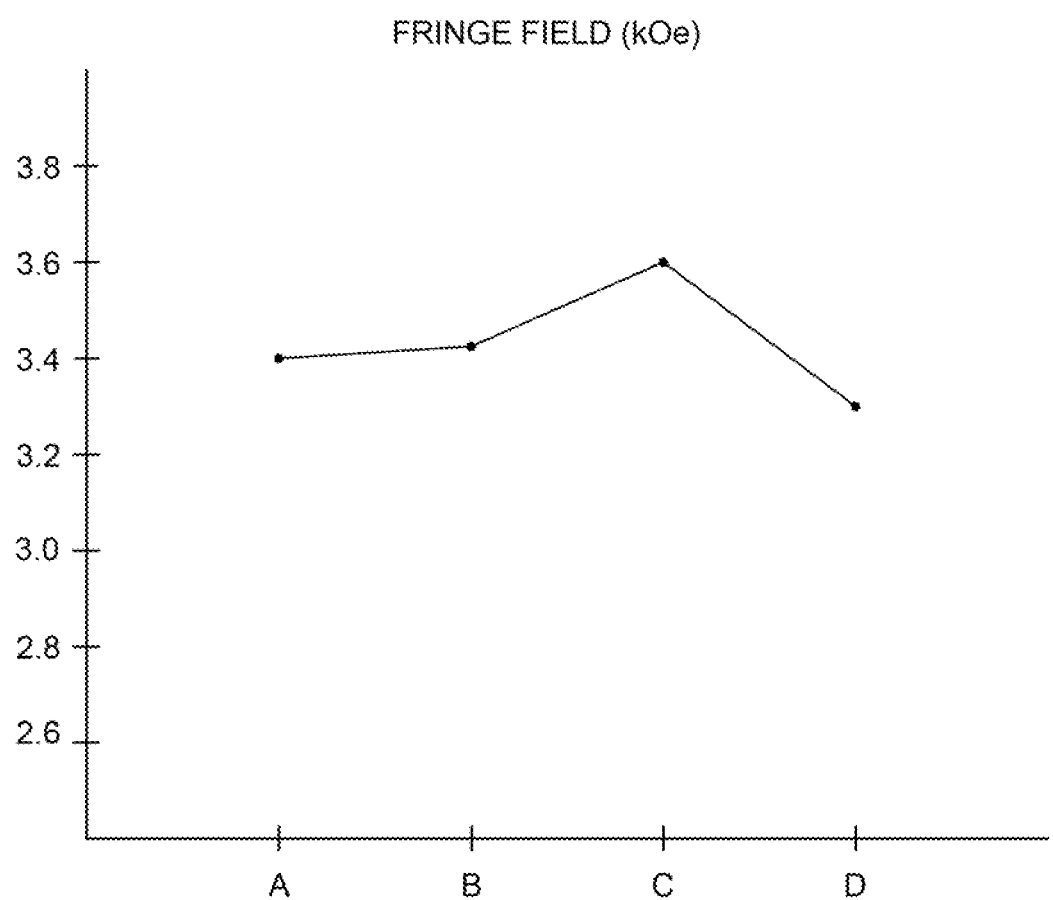
FIG. 9 is a graph of fringing field for various magnetic write head configurations at the second side gap length.
Figure 10:
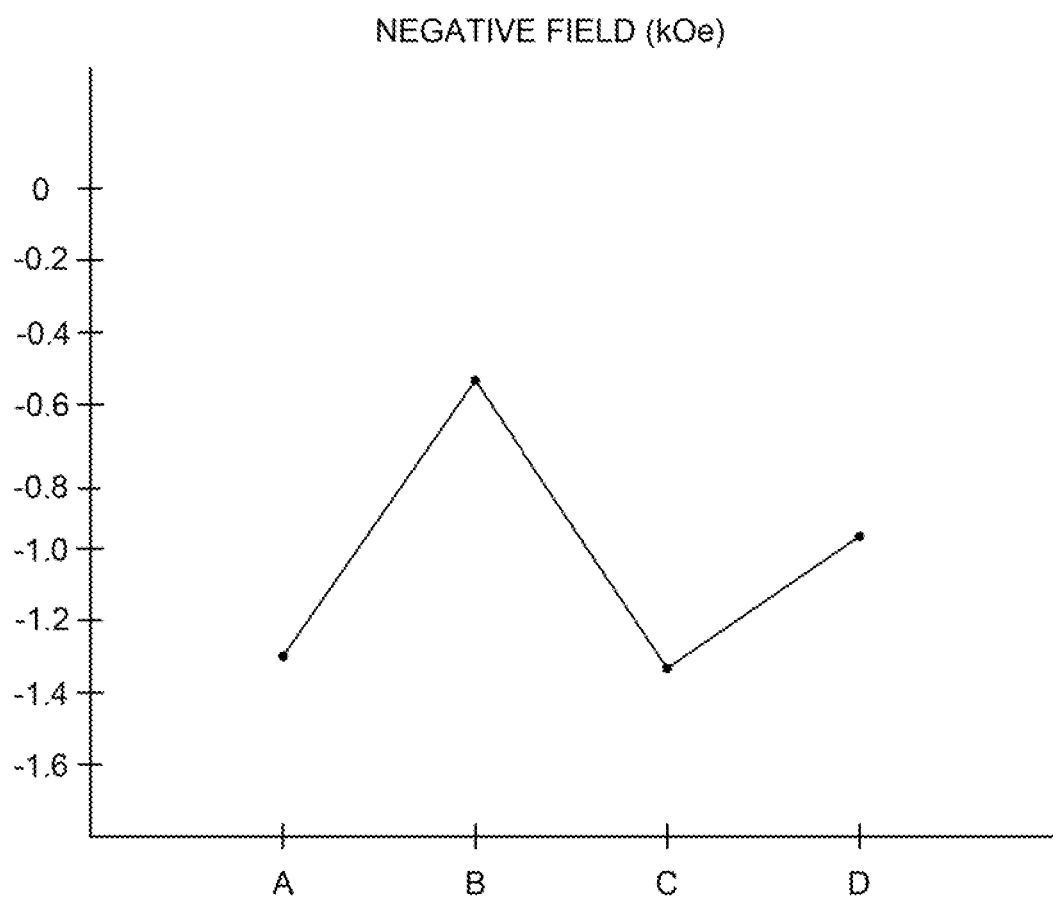
FIG. 10 is a graph of negative field for various magnetic write head configurations at the second side gap length.

FIGS. 5, 6 and 7 illustrate the various performance characteristics for various write head structures. Each of the graphs of FIGS. 5, 6 and 7 illustrate such performance characteristics for a write head having a side gap length SG of 60 nm and a trailing shield gap TG of 30 nm, and in the graphs of each of FIGS. 5, 6 and 7 the location A corresponds to a write head having a bump height BH (FIG. 4) that is equal to ½ the trailing gap (TG). Location B corresponds to a write head having a bump height (BH) that is equal to the trailing gap (TG). Location C represents a write head having no convex bump 422, 424 (FIG. 4), and location D represents a write head having no bump and no laterally extending gap wings 418, 420 (FIG. 4). FIGS. 8, 9 and 10 are similar to those of FIGS. 5, 6 and 7 respectively, except that they illustrate the performance characteristics for a write head having a side shield gap of only 30 nm (e.g. equal to the trailing gap).

The field gradient and fringe field to the adjacent tracks, and the magnitude of the negative field are, therefore evaluated in FIGS. 5, 6 and 7 respectively for a write head having a side gap of 60 nm. As can be seen, for the write head having a convex bump (graph locations A and B) the negative field was reduced (increase in the absolute value) compared with a structure having wing extension 418, 420 but no convex bump 422, 424 (corresponding to location C on FIG. 7), indicating improved performance. Furthermore, FIG. 5 indicates an improvement in average field gradient for a write head having the convex bump (graph locations A and B) compared with a structure having no bump (graph locations C and D). The improved performance of the a write head having a convex bump is indicated by the increase in average field gradient with reduced impairment of fringe field and negative magnetic field.

FIGS. 8, 9 and 10 show the performance characteristics for a write head wherein the side gap is 30 nm or about equal to the trailing gap. This was done in order to examine the relationship between convex part height and side shield gap. As shown by the results in FIGS. 8, 9 and 10, when the convex part height is equal to the trailing gap, the amount of write pole magnetic flux lost to the trailing shield was reduced, and reduction in the negative field was apparent. From the above it can be concluded that the improvements resulting from the present invention are maximized when the height of the convex bump is at least ½ of the trailing gap and no more than ½ of the side shield gap.

Figure 11:
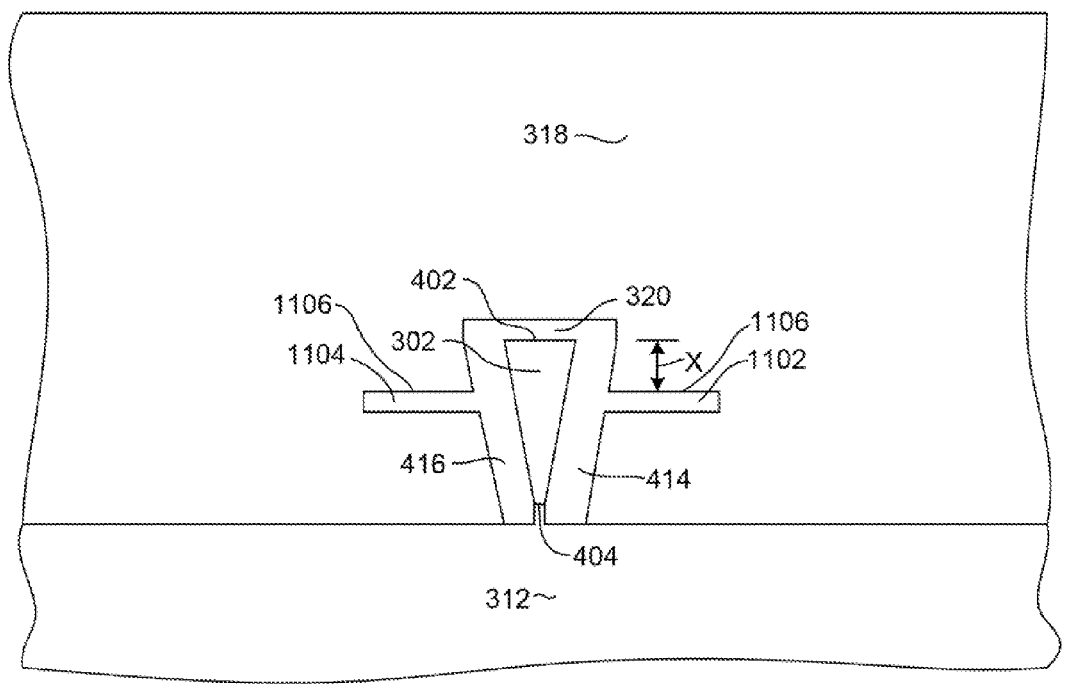
FIG. 11 is an ABS view of a portion of a write head according to an alternate embodiment of the invention.

With reference now to FIG. 11, another embodiment of the invention includes non-magnetic side gap wing extensions 1102, 1104 that are not located at the trailing gap 320, but, rather, are located at a location at a level that is between the trailing edge 402 and leading edge 404 of the write pole 302. As shown in FIG. 11, the non-magnetic side gap wing extensions each have a trailing edge 1106 that is separated from a plane defined by the trailing edge 402 of the write pole 302 by a distance X.

The structure of FIG. 11, wherein the third gap is located between the levels of the leading edge 402 and trailing edge 404 was investigated in an embodiment in which the gap length of 1102 and 1104 (measured vertically in FIG. 11) was about equal to the trailing gap length 320, and wherein the amount of offset X between the level of the leading edge 402 and the location of the wing extensions 1102, 1104 was 20 or 40 nm.

Figure 12:
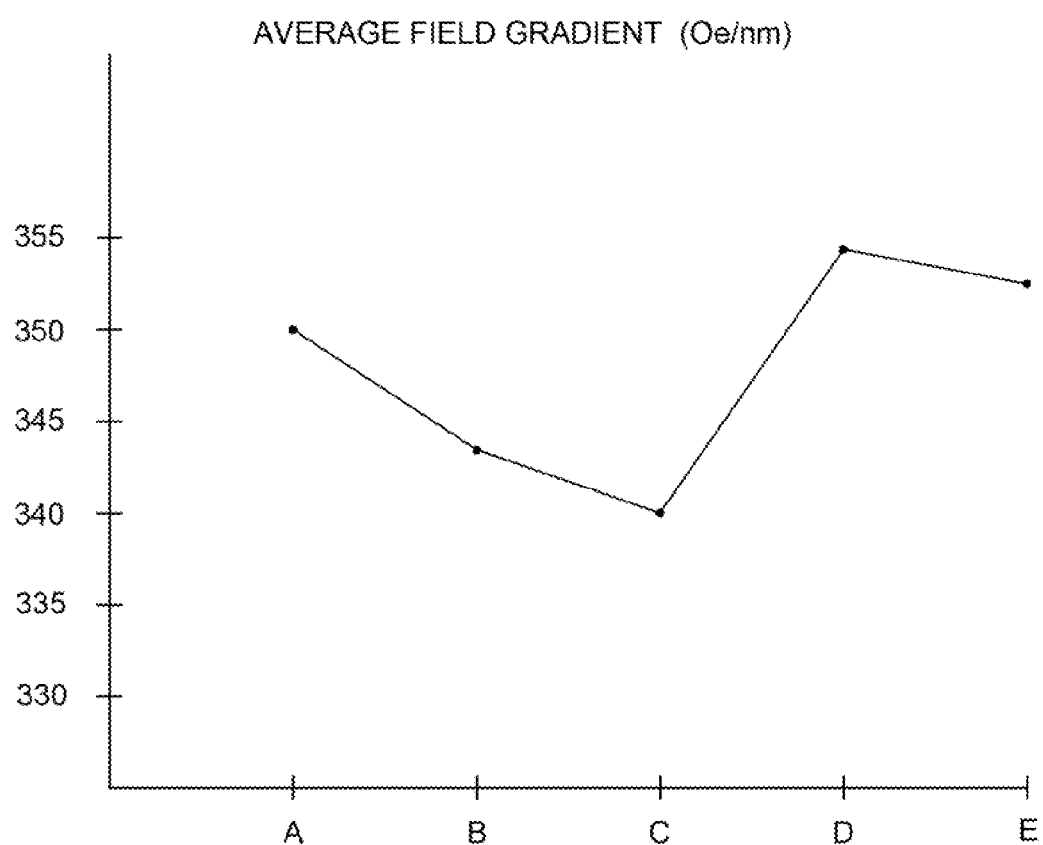
FIG. 12 is a graph of field gradient for various write head configurations including the alternate embodiment of FIG. 11.
Figure 13:
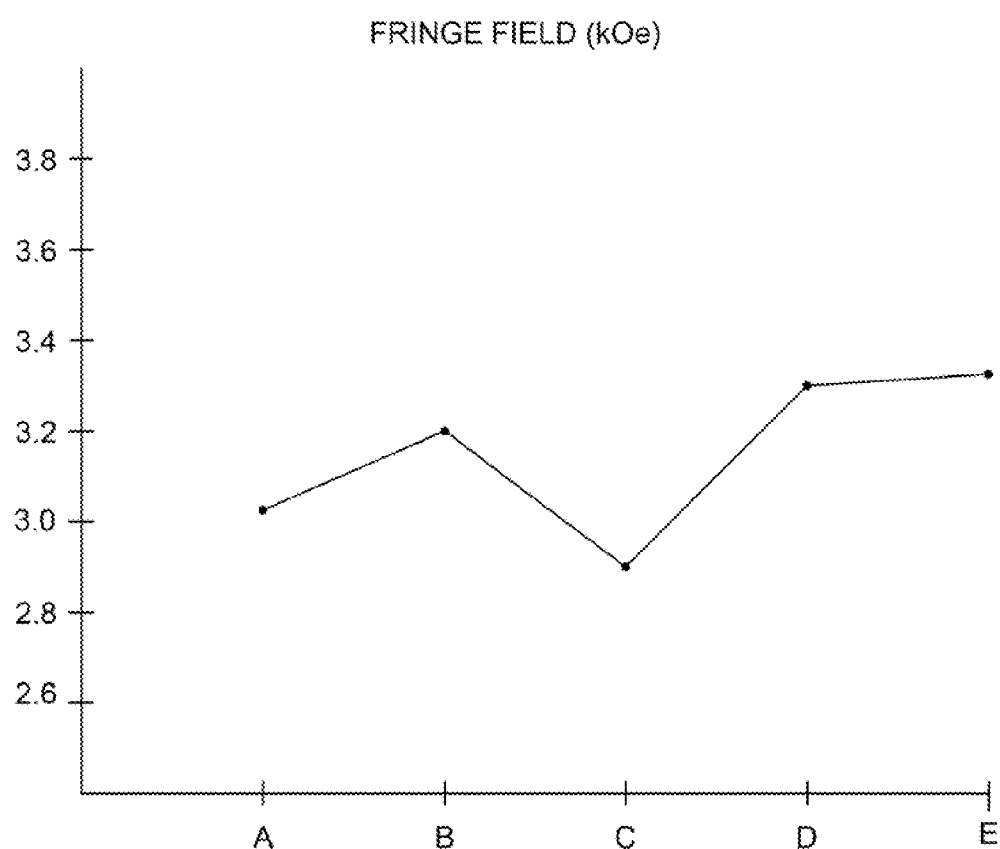
FIG. 13 is a graph of fringing field for various write head configurations including the alternate embodiment of FIG. 11.
Figure 14:
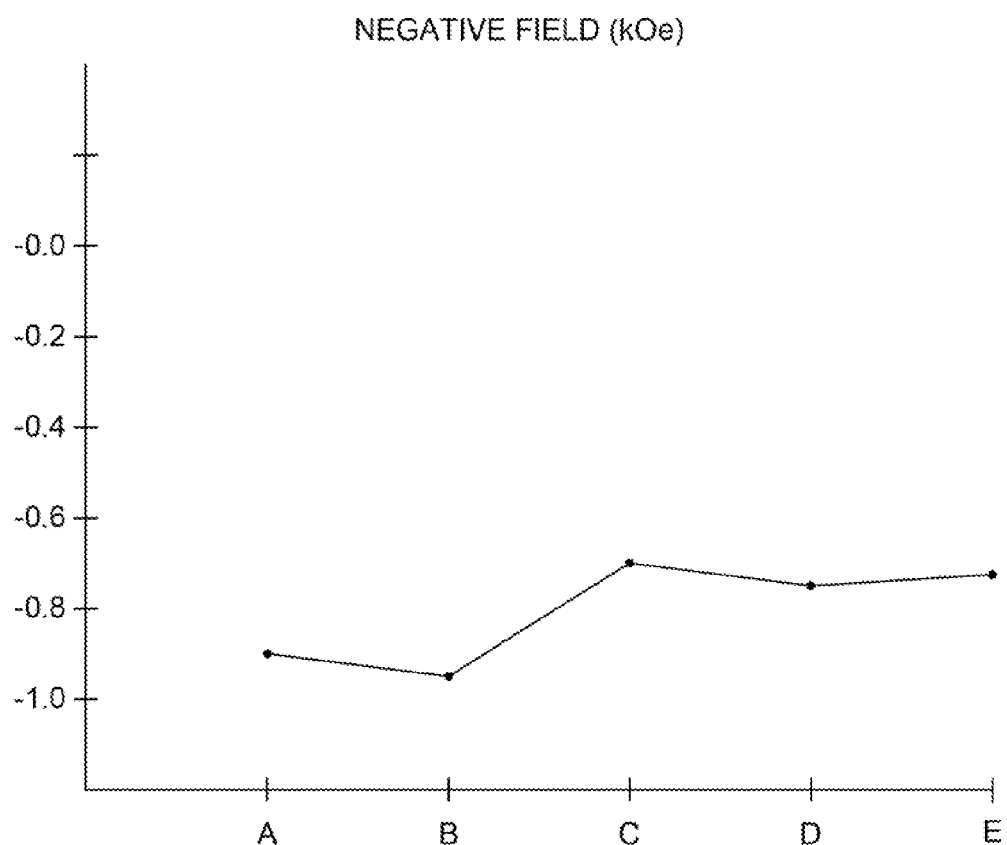
FIG. 14 is a graph of negative field for various write head configurations including the alternate embodiment of FIG. 11.

FIGS. 12, 13 and 14 illustrate various performance variables for various write head configuration in order to compare the performance of the write head of FIG. 11 with that of other configurations. FIG. 12 shows the Average Field Gradient for various write head configurations. FIG. 13 shows the Fringing Field for various write head configurations, and FIG. 14 shows the Negative Field for various write head configurations. In each of FIGS. 12, 13 and 14, the location A represents the performance of a structure such as that of FIG. 4. Location B represents the performance of a write head having a "T" shaped trailing gap as in FIG. 4, but with no convex bump structures 422, 424. Location C represents a write head having a conformal trailing wrap-around shield with no "T" shaped trailing gap and no offset trailing gap. Location D represents the performance of a structure such as that of FIG.

11 with an offset X that is equal to the length of the trailing gap 320, and location E represents the performance for a head having an offset X that is equal to two times the length of the trailing gap.

For the purposes of FIGS. 12, 13 and 14, the trailing gap length was set at 20 nm. As shown in FIGS. 12 and 14 the field gradient and negative field for a head having an offset (locations D and E) was roughly equivalent to that for the structure of FIG. 4. However, the Fringing Field (FIG. 13) tended to deteriorate, and therefore, a head having an offset was found to be useful in a range where the fringe field does not exceed the permitted drive values.

Figure 15:
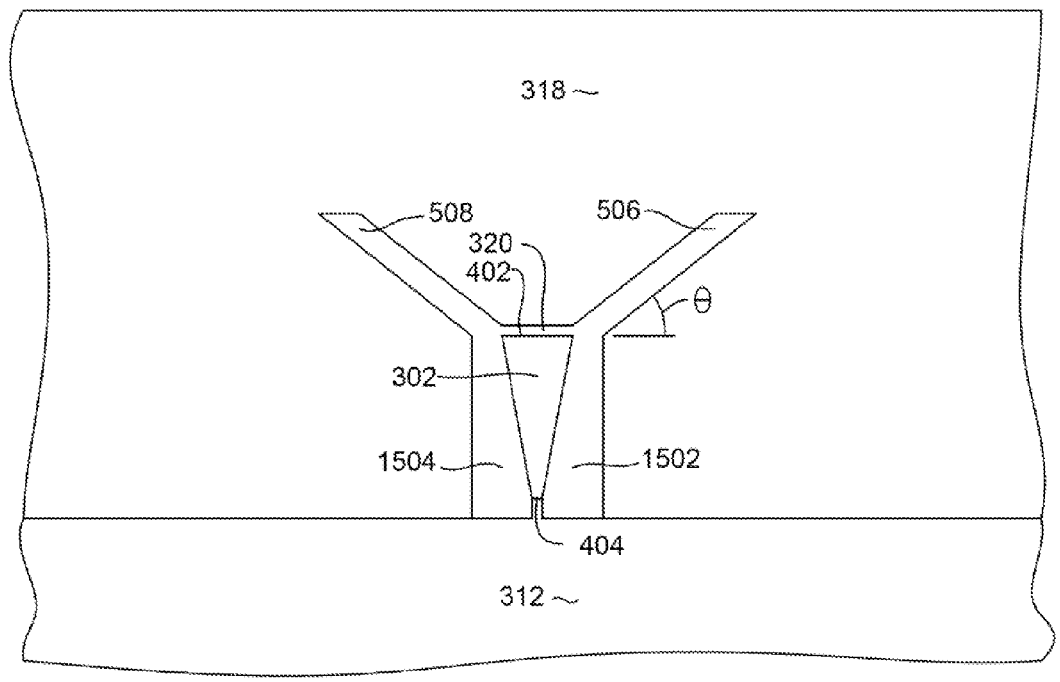
FIG. 15 is an ABS view of a portion of a write head according to yet another embodiment of the invention.

FIG. 15 illustrates yet another possible embodiment of a write head as viewed from the ABS. The head of FIG. 15 has side shield gap 1502, 1504, and a trailing gap 320, and has laterally extending, non-magnetic gap wings 506, 508, that are angled as shown in FIG. 15. The gap wings 506, 508 comprise a non-magnetic material such as (for example) alumina, and are formed at an angle θ relative to a plane that is parallel with the trailing edge 402.

Figure 16:
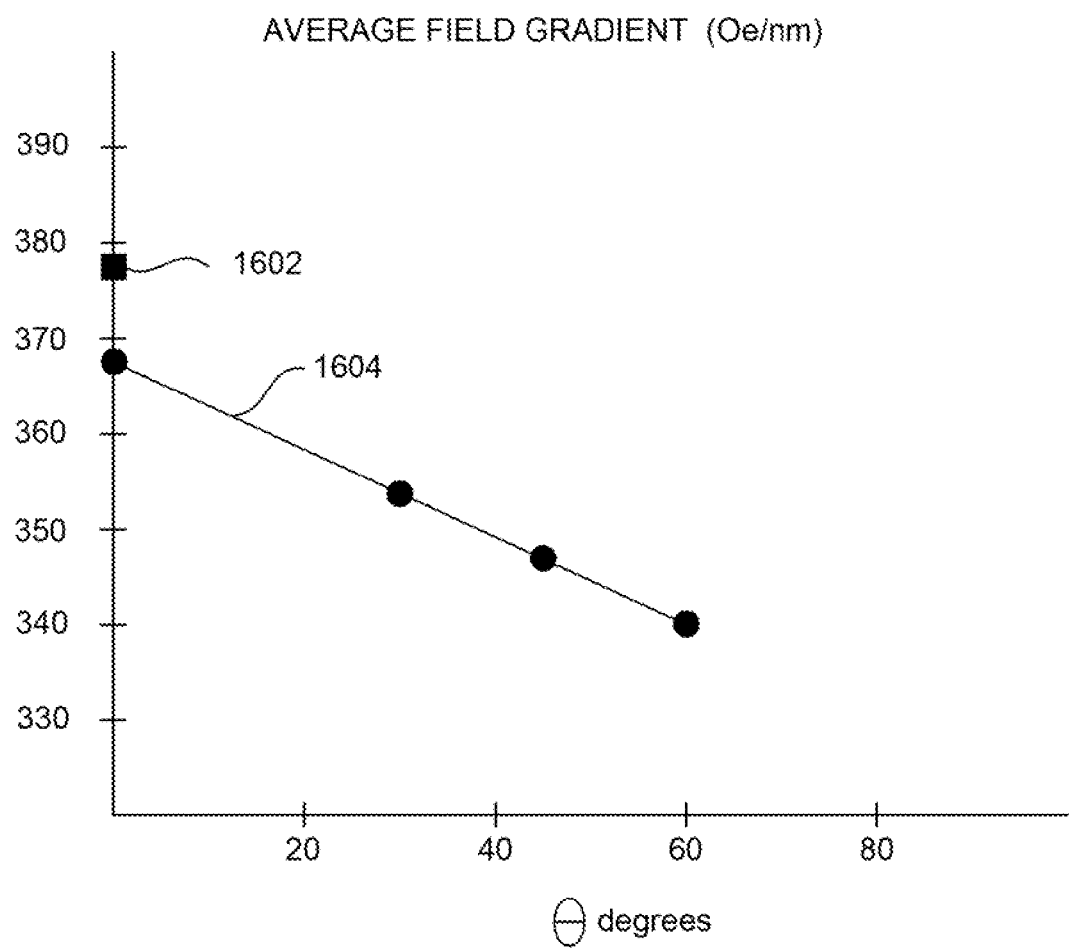
FIG. 16 is a graph of field gradient for various gap extension angles for the embodiment of FIG. 15.

The Average Field Gradient for a head having various slope angles θ is shown in FIG. 16. In FIG. 16, the location 1602 is the field gradient for a head such as that of FIG. 4, having a convex bump 422, 424 and zero slope angle θ. The line 1604 shows the Average Field Gradient in Oe/nm for a head for various wing angles θ for a head having no convex bump 422, 424 (e.g. the structure of FIG. 15). When the angle θ was varied (without the convex bump), the magnetic field curvature was somewhat improved the greater the angle θ, but as can be seen in FIG. 15, it deteriorated with increasing average field gradient. This is because the gap was "Y" shaped, and as a result, the trailing shield gap length is greater in the region of the track ends. The field gradient was worse than in the structure of FIG. 4, but even though the average gradient in the "Y" shaped gap structure of FIG. 15 for which θ=30 degrees deteriorated by 4% compared with a structure having an angle θ of 0 degrees (without the convex bump), an effect was achieved of improving the magnetic field curvature by 4% and the negative field by 15%.

The increase in field gradient for a structure as shown in FIG. 4 and FIG. 11 was found to be 15-20 Oe/nm greater than a prior art structure having no convex bump and no wing gap offset. The accompanying signal to noise ratio SNR was estimated by Read/Write (RW) calculation using micro-magnetic simulation of current media, the increase in SNR produced by the above mentioned field gradient remained at 0.2-0.3 dB, but with refined media which are currently under development, it is likely that the magnetic particle size of media will be around 7% smaller than that of existing media, and as a result, the SNR gain produced by the increased field gradient will increase and an improvement in SNR of 0.5-0.6 dB can be anticipated. The finer the magnetic particle size of the medium, the greater the SNR gain produced by the increased field gradient will be, making the inventive head structure even more effective for a high density recording medium.

Figure 17:
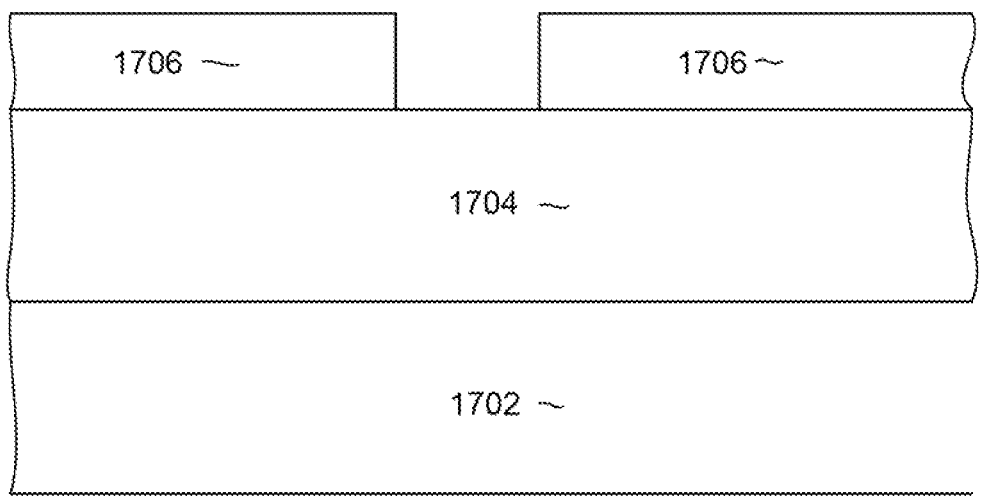
FIGS. 17-25 are views of a write head in various intermediate stages of manufacture, illustrating a method of manufacturing a write head according to an embodiment of the invention.
Figure 18:
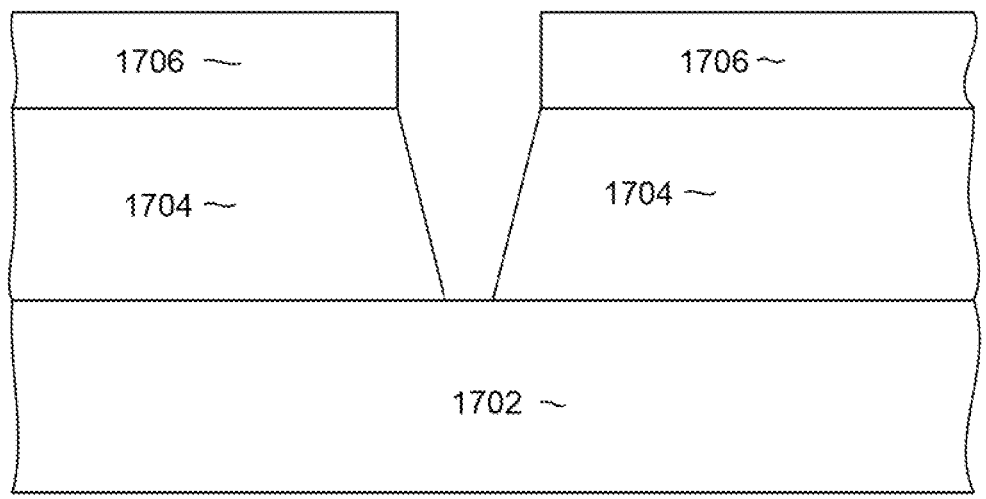
Figure 19:
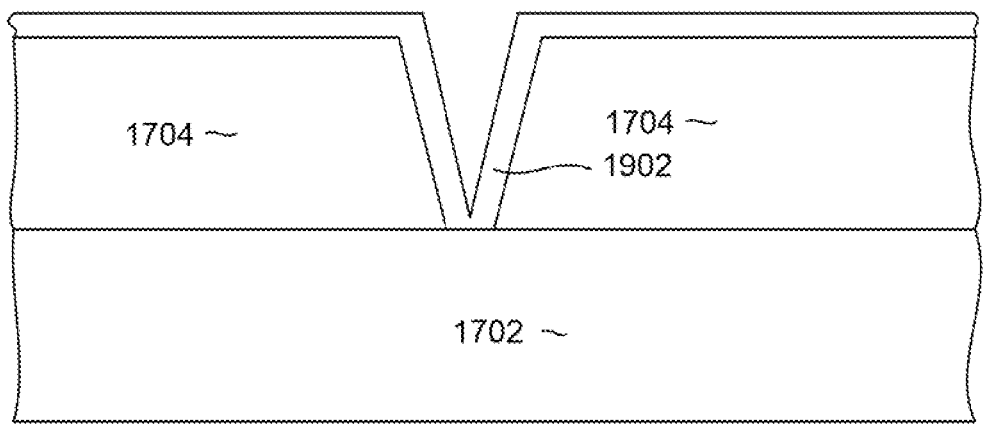

FIGS. 17-25 illustrate a method of manufacturing a magnetic write head such as that described above with reference to FIG. 4. With particular reference to FIG. 17, a substrate 1702 is provided, which can be a material such as alumina and can also include all or a portion of a magnetic structure such as a shaping layer 306 (FIG. 3). A magnetic material 1704 such as NiFe is then deposited over the substrate 1702. The magnetic layer 1704 is deposited to a length that is at least as thick as the height of a write pole to be formed. A mask structure 1706 is then formed over the magnetic material 1704. The mask can be a patterned photoresist layer and can include other material layers as well. The mask has an opening that is configured to define a write pole. Then, a reactive ion etching is performed to remove portions of the magnetic material layer 1704 that are not protected by the mask 1706, thereby forming a trench as shown in FIG. 18. The reactive ion etching is preferably performed in such a manner as to form a trench with tapered side walls as shown. The photoresist can then be lifted off, and a non-magnetic material such as Ru 1902 is deposited by a conformal deposition process such as atomic layer deposition to evenly coat the inside walls of the trench. This non-magnetic material 1902 provides a non-magnetic side gap, and also advantageously reduces the track width of the write pole, as will be seen.

Figure 20:
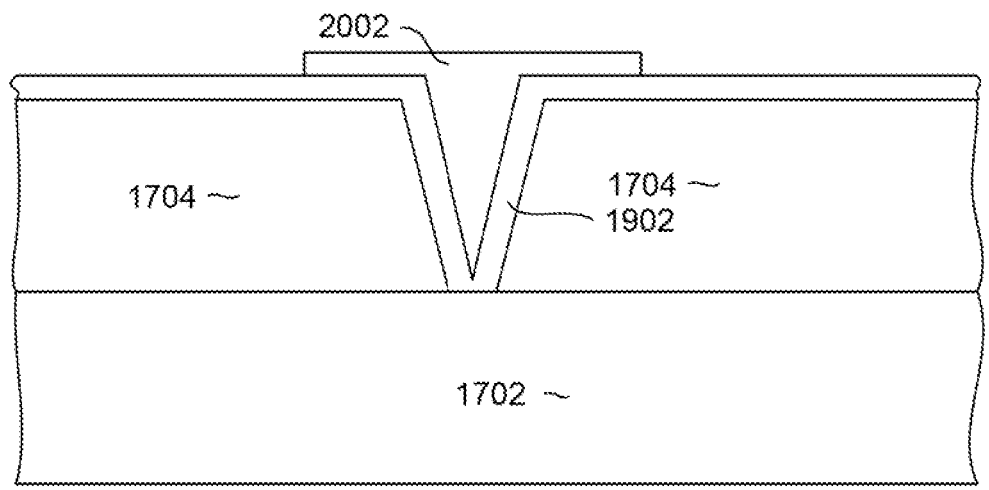
Figure 21:
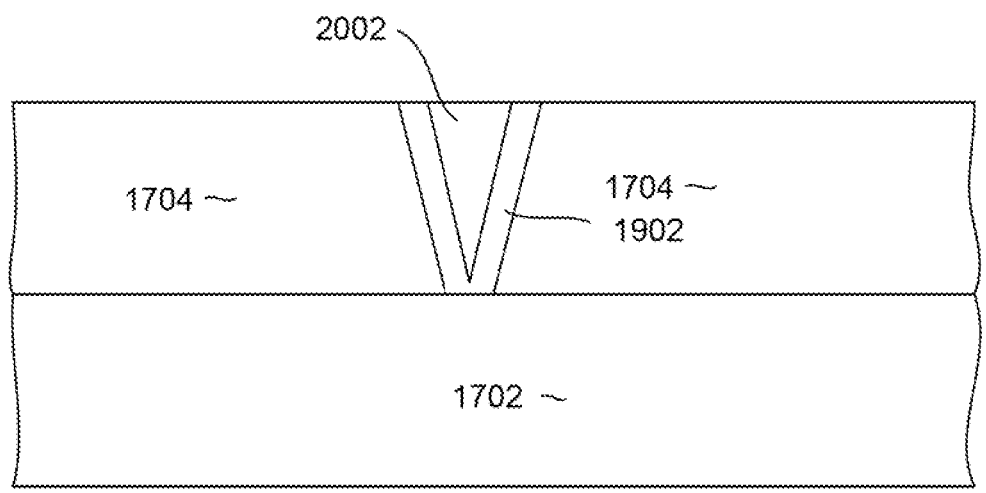

A magnetic material 2002 can then be electroplated into the trench, over the non-magnetic layer 1902 as shown in FIG. 20. The non-magnetic layer 1902 can be used as an electroplating seed. A chemical mechanical polishing process can then be performed planarize the structure and to remove portions of the layers 1902, 2002 that extend outside of the trench.

Figure 22:
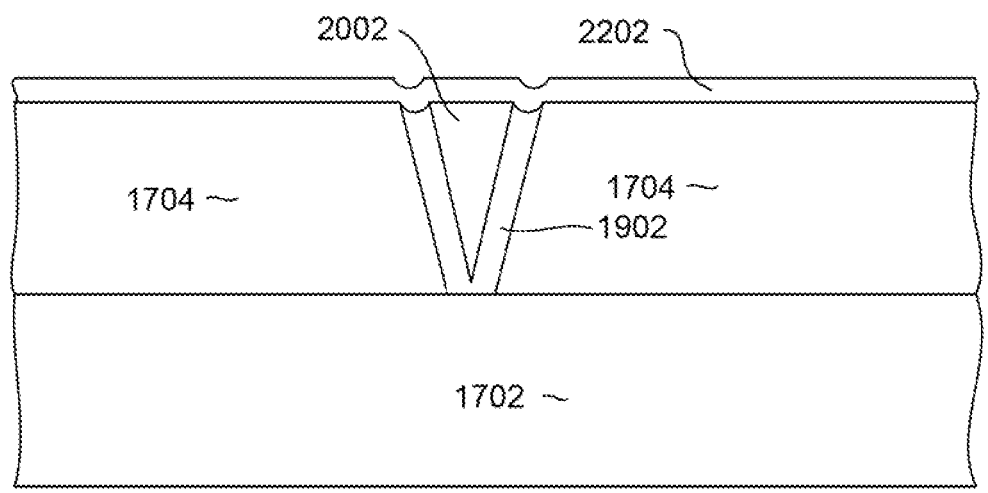

A reactive ion etching is then performed to remove a portion of the side gap material 1902, forming a recess in the top of the layer 1902. This reactive ion etching can be performed in a chemistry that preferentially removes the side gap material at a faster rate than the magnetic material 1704 or 1902. Then, a trailing gap material 2202 such as alumina is deposited to a length of a desired trailing gap as shown in FIG. 22.

Figure 23:
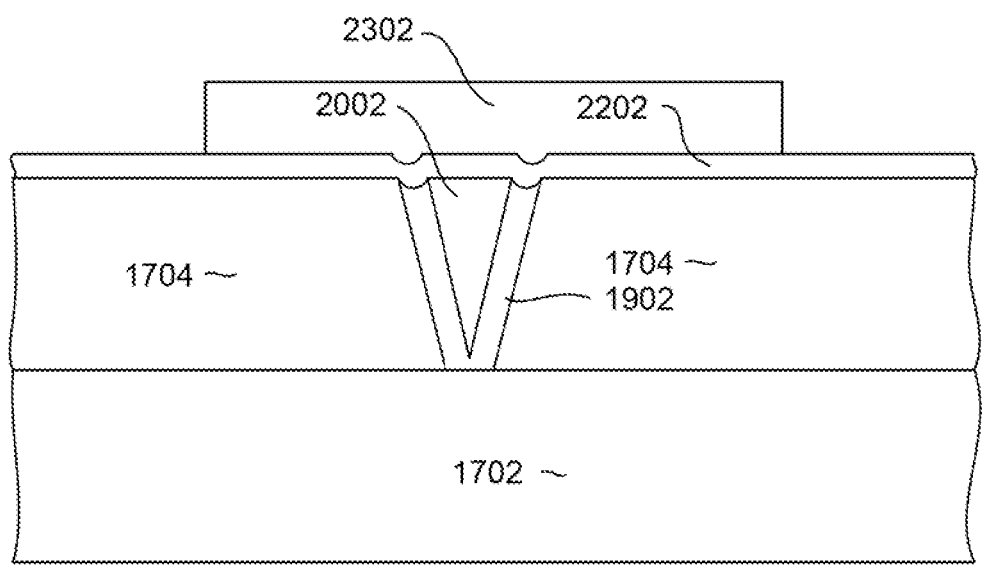
Figure 24:
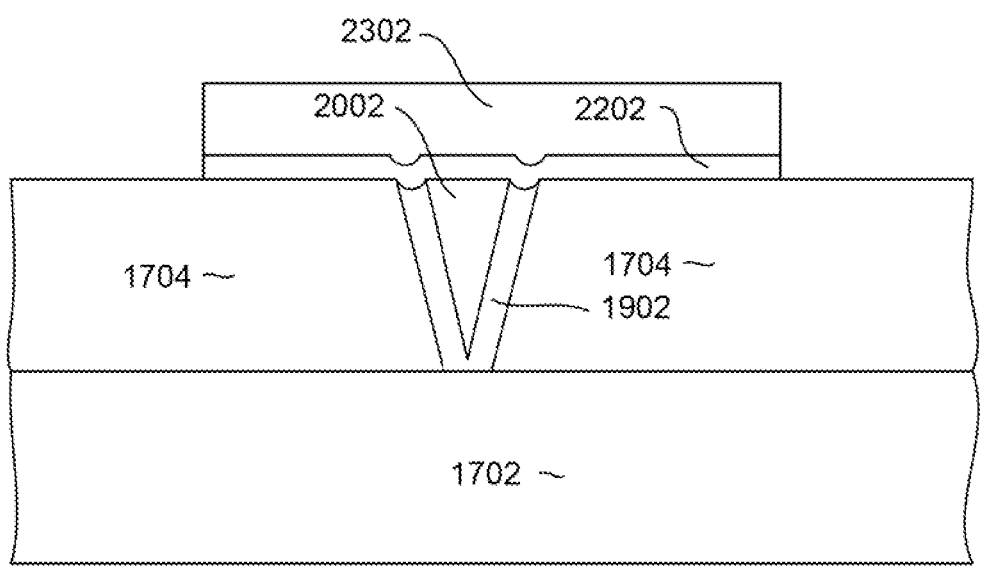
Figure 25:
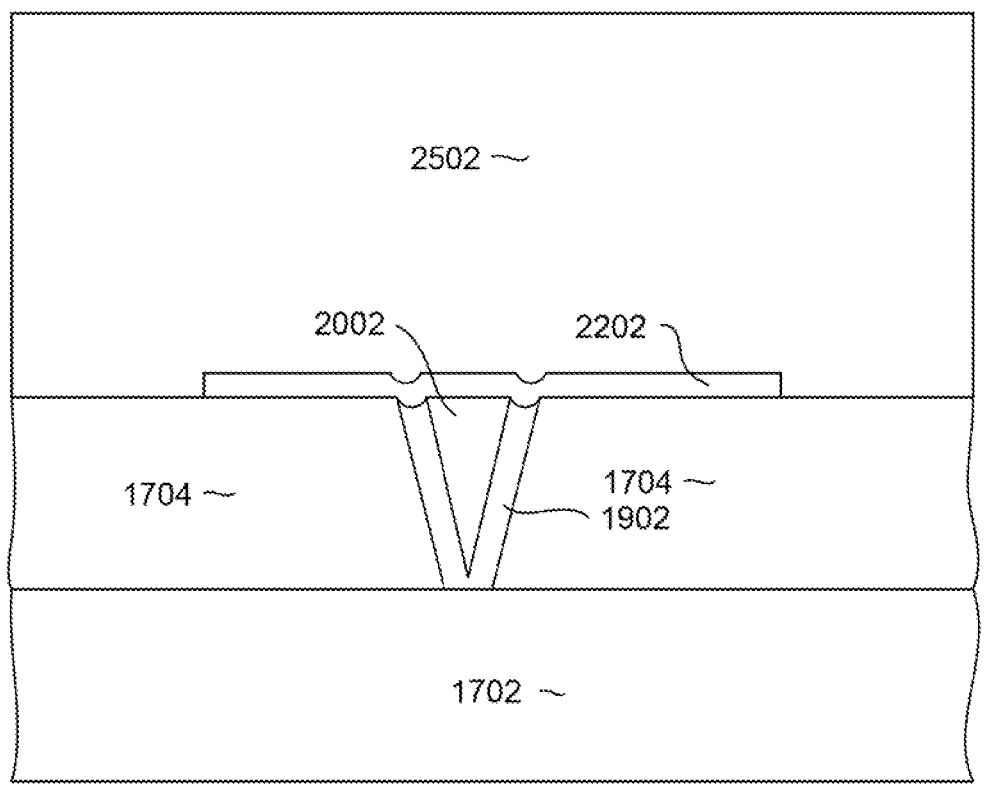

With reference to FIG. 23, a mask 2302 is then formed having a width that is chosen to determine the extent to which the trailing gap will extend laterally beyond the write pole 2002. An ion milling or reactive ion etching is then performed to remove portions of the trailing gap layer 2202 that are not protected by the mask 2302, leaving a structure as shown in FIG. 24. The mask 2302 can then be removed and a trailing shield 2502 can be formed by electroplating a magnetic material such as NiFe.

Figure 26:
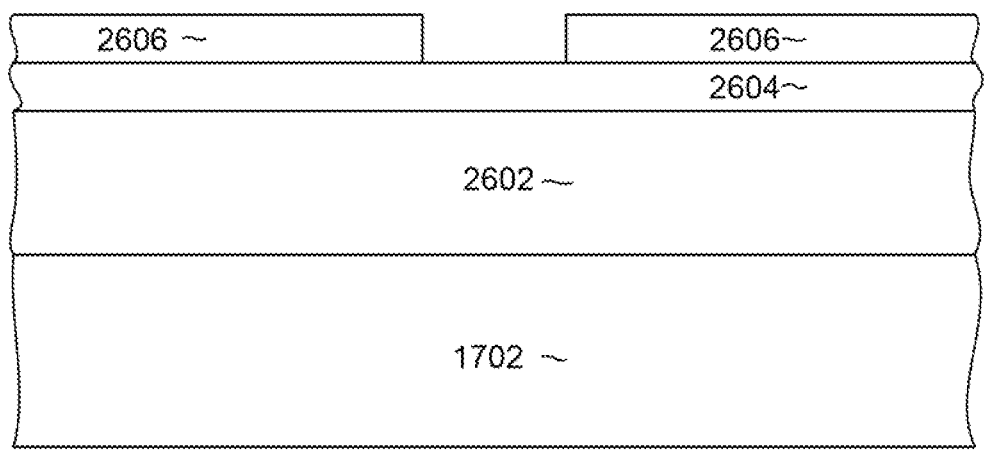
FIGS. 26-34 are views of a write head in various intermediate stages of manufacture, illustrating a method of manufacturing a write head according to another embodiment of the invention.

FIGS. 26-34 illustrate a method for manufacturing a magnetic write head such as the write head described above with regard to FIG. 11. With particular reference to FIG. 26, a substrate 1702 is provided and magnetic material 2602 such as NiFe is deposited over the substrate. A layer of RIEable, CMP resistant material such as diamond like carbon (DLC) is deposited over the magnetic material 2602. A mask 2606 is formed over the layer 2604. The mask can be a patterned photoresist mask but can contain other layers as well and has an opening that is configured to define a write pole.

Figure 27:
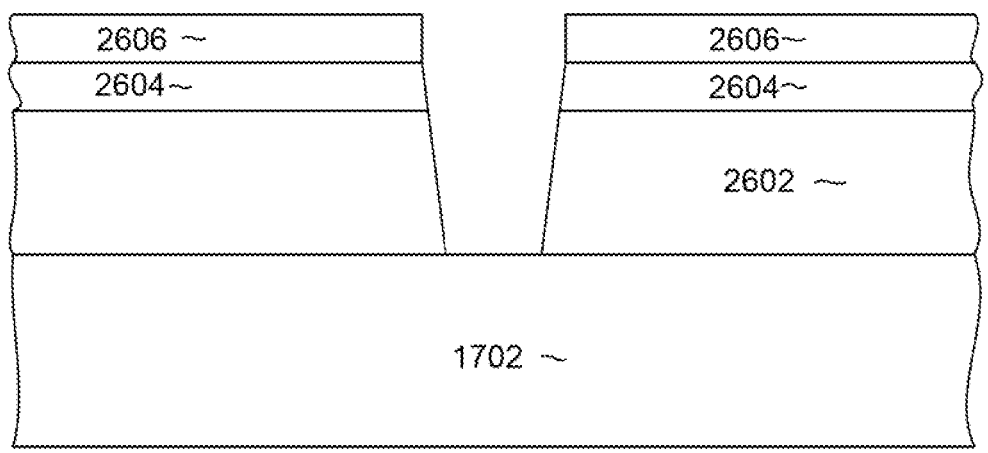
Figure 28:
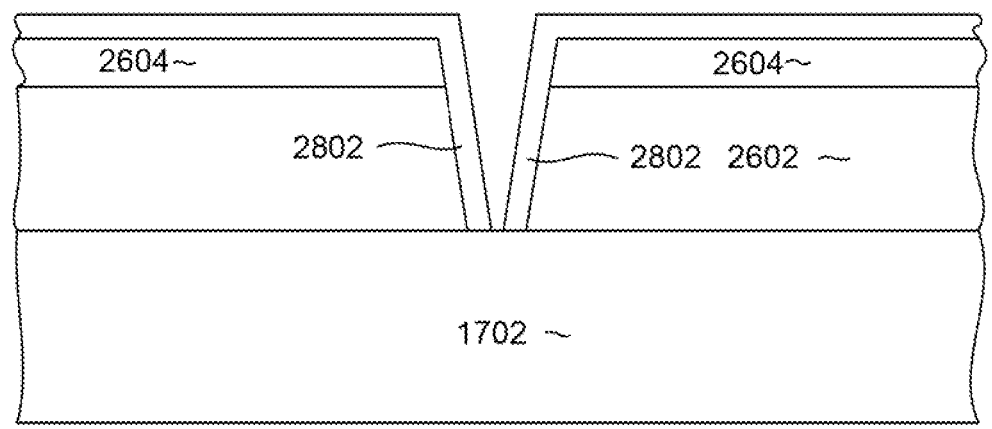

A material removal process such as ion milling and/or reactive ion etching is performed to remove portions of the layers 2602, 2604 that are not protected by the mask 2606, leaving a structure as shown in FIG. 27. The mask 2606 can then be lifted off, and a non-magnetic, electrically conductive material such as Ru can be conformally deposited, leaving a structure such as that shown in FIG. 28.

Figure 29:
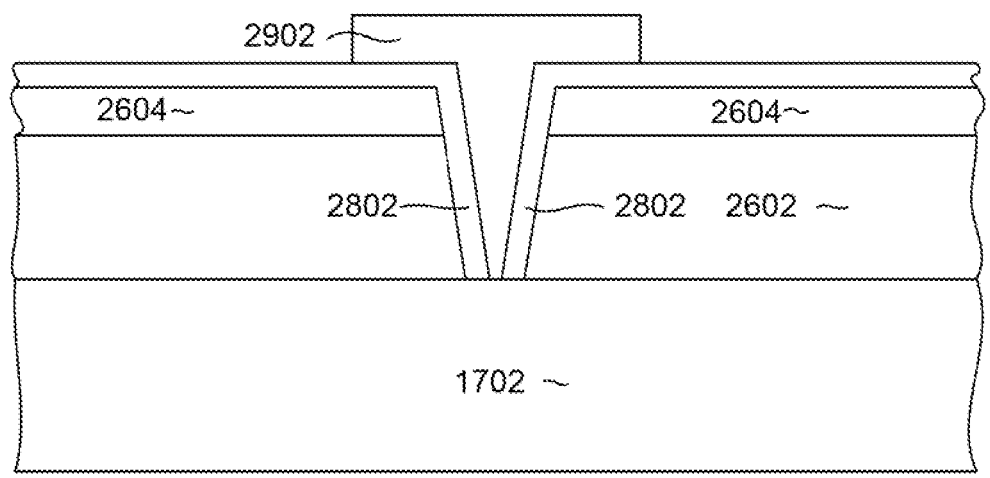

A magnetic material 2902 can then be deposited by electroplating, leaving a structure such as that shown in FIG. 29. This can be followed by a chemical mechanical polishing process that removes portions of the layers 2802 and 2902 that extend out of the trench. The CMP is terminated at the layer 2604, which as mentioned above is a CMP resistant material. This leaves a structure as shown in FIG. 30.

Figure 30:
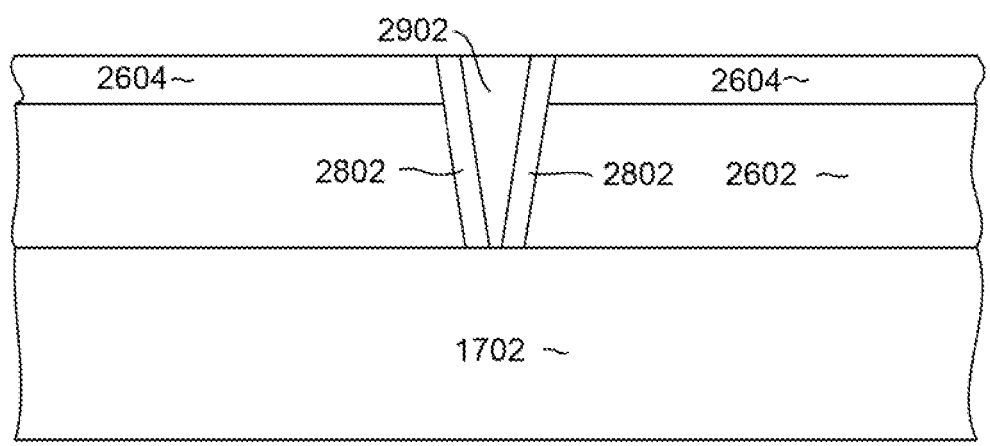
Figure 31:
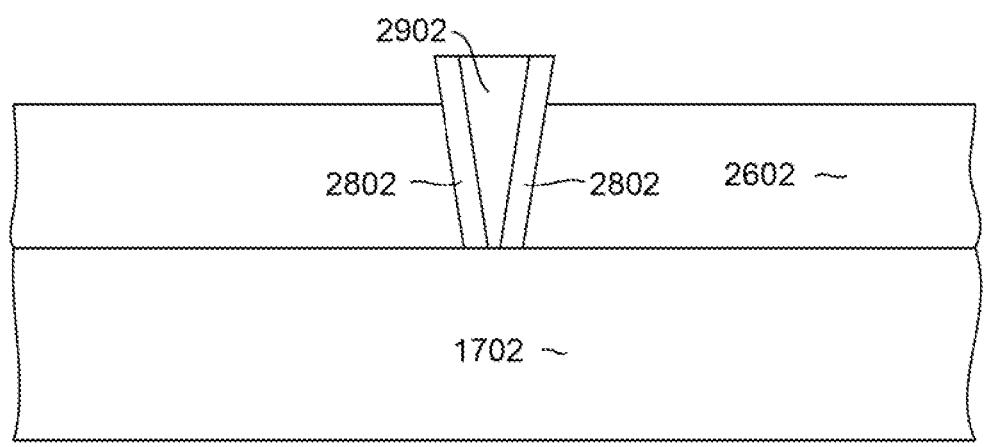
Figure 32:
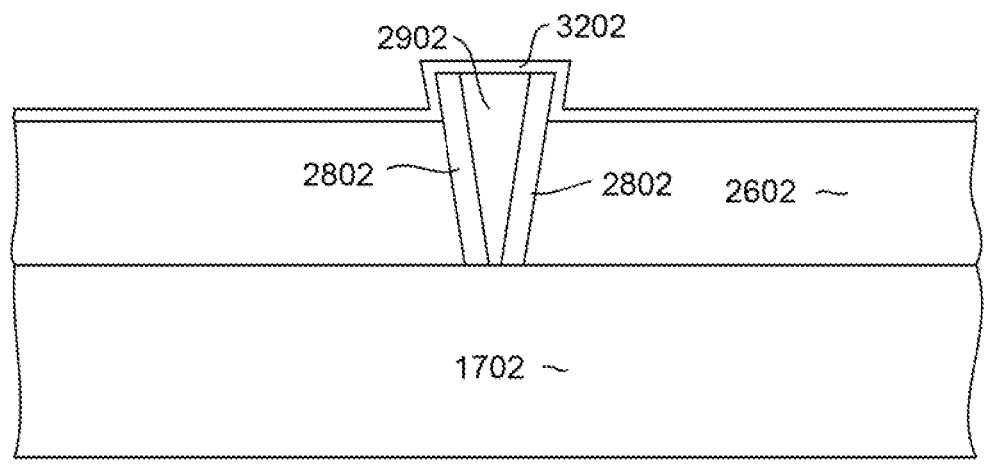
Figure 33:
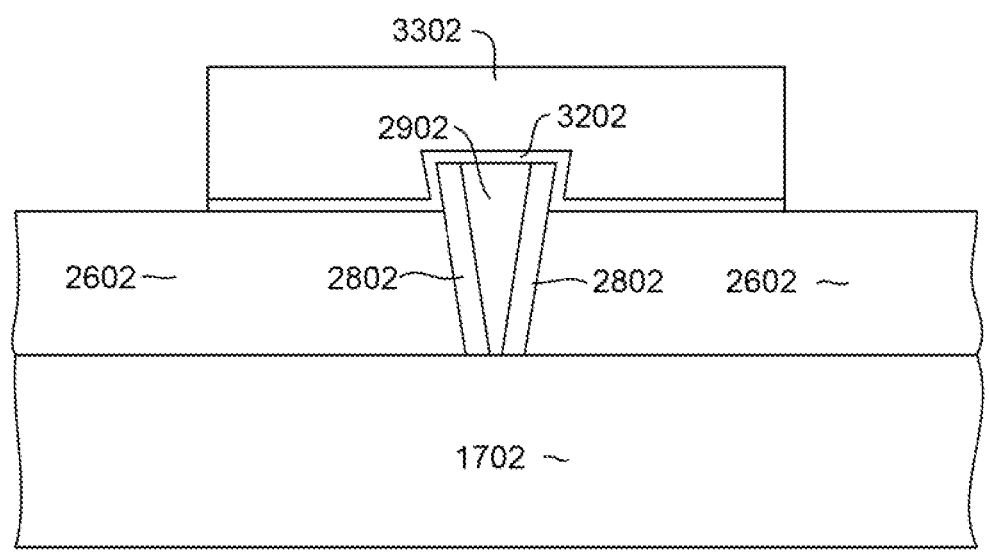
Figure 34:
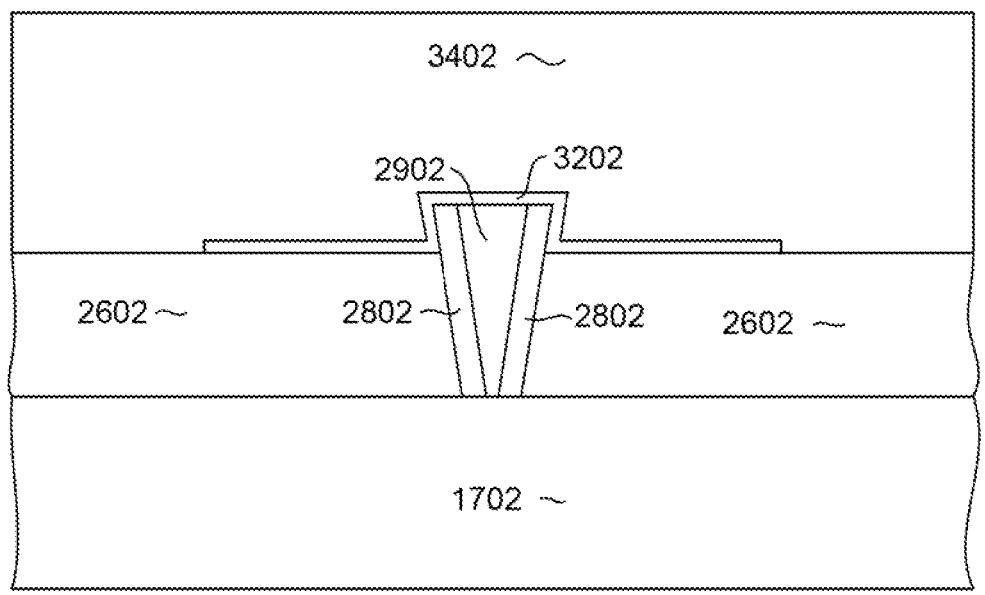

With the layer 2604 exposed as shown in FIG. 30, a reactive ion etching (RIE) can be performed to remove the remaining layer 2604, leaving a structure as shown in FIG. 31, with the write pole 2902 and non-magnetic side gap layers 2802 extending out of the top of the magnetic material 2602. Then with reference to FIG. 32 a non-magnetic trailing gap material layer 3202 is deposited to a length that is chosen to define a trailing gap. With reference to FIG. 33, a mask 3302 is formed over the structure, the mask 3302 having a width that will determine the amount by which the trailing gap layer 3202 extends laterally from the write pole and side gap layers 2802. A quick reactive ion etching or on milling is then performed to remove portions of the trailing gap layer 3202 that extend beyond the mask 3302.

The mask 3302 can then be lifted off. A trailing magnetic shield 3402 can then be formed by electroplating a material such as NiFe, leaving a structure such as that shown in FIG. 34. As can be seen, extending side portions of the gap layer 3202 are offset by a distance X. This amount of this offset X is determined by the layer 2604, the deposition of which was described above with reference to FIG. 26.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
a magnetic write pole having a trailing edge, a leading edge and first and second laterally opposed sides each extending from the leading edge to the trailing edge; and
a magnetic shield separated from each of the first and second laterally opposed sides of the magnetic write pole by first and second non-magnetic side gap layers and separated from the trailing edge of the magnetic write pole by a non-magnetic trailing gap layer, the non-magnetic trailing gap layer extending laterally beyond the first and second sides of the write pole and laterally beyond the non-magnetic side gap layer;
wherein the magnetic shield has first and second convex bumps each of the convex bumps being located at a junction between one of the non-magnetic side gap layers and the trailing gap layer.

2. The magnetic write head as in claim 1 wherein the magnetic shield has a. leading edge that contacts the trailing non-magnetic gap, and wherein each of the first and second convex bumps is formed on the leading edge of the magnetic shield.

3. The magnetic write head as in claim 1 wherein the first and second non-magnetic side gap layers comprise Ru.

4. The magnetic write head as in claim 1 wherein the non-magnetic trailing shield comprises alumina.

5. The magnetic write head as in claim 1 wherein the first and second non-magnetic side gap layers comprise Ru and the non-magnetic trailing shield comprises alumina.

6. The magnetic write head as in claim 1 wherein the non-magnetic trailing gap has a trailing gap length and wherein each of the first and second convex bumps has a height that is about equal to ½ the trailing gap length.

7. The magnetic write head as in claim 1 wherein the non-magnetic trailing gap ahs a trailing gap length and wherein each of the first and second convex bumps has a hump height that is at least ½ the trailing gap length.

8. The magnetic write head as in claim 1 wherein each the first and second non-magnetic side gaps has a side gap length and wherein each of the convex bumps has a bump height that is no greater than ½ the side gap length.

9. The magnetic write head as in claim 1 wherein the non-magnetic trailing gap has a trailing gap length, each of the first and second non-magnetic side gaps has a side gap length, and each of the convex bumps has a bump height that is at least ½ the trailing gap length and no more than ½ the side gap length.

10. A magnetic write head, comprising:
a magnetic write pole having a trailing edge, a leading edge and first and second laterally opposed sides each extending from the leading edge to the trailing edge; and
a magnetic shield separated from each of the first and second laterally opposed sides of the magnetic write pole by first and second non-magnetic side gap lavers and separated from the trailing edge of the magnetic write pate by a non-magnetic trailing gap layer; and
non-magnetic gap wings extending laterally outward from the non-magnetic side gaps, the non-magnetic wing extensions being offset from the leading edge of the write pole;
wherein the leading edge of the write pole defines a first plane and the trailing edge of the write pole defines a second plane and wherein the non-magnetic wing extensions are located between the first plane and the second plane.

11. The magnetic write head as in claim 10 wherein the non-magnetic side gaps comprise Ru.

12. The magnetic write head as in claim 10 wherein the non-magnetic side gaps comprise Ru and the trailing gap comprises alumina.

13. The magnetic write head as in claim 10 wherein the non-magnetic side gaps comprise Ru, the trailing gap comprises alumina and the nonmagnetic gap wings comprise alumina.

14. A magnetic write head, comprising:
a magnetic write pole having a trailing edge, a leading edge and first and second laterally opposed sides each extending from the leading edge to the trailing edge; and
a magnetic shield separated from each of the first and second laterally opposed sides of the magnetic write pole by first and second non-magnetic side gap layers and separated from the trailing edge of the magnetic write pole by a. non-magnetic trailing gap layer; and
non-magnetic gap wings extending laterally outward from the non-magnetic side gaps, the non-magnetic wing extensions being offset from the leading edge of the write pole;
wherein the trailing edge of the write pole defines a plane and wherein, the non-magnetic trailing gap has a length that defines a trailing gap length and the non-magnetic gap wings are offset from the plane by a distance that is about equal to the trailing gap length.

15. A magnetic write head, comprising:
a magnetic write pole having a trailing edge, a leading edge and first and second laterally opposed sides each extending from the leading edgy to the trailing edge; and
a magnetic shield separated from each of the first and second laterally opposed sides of the magnetic write pole by first and second non-magnetic side gap layers and separated from the trailing edge of the magnetic write pole by a non-magnetic trailing gap layer; and
non-magnetic gap wings extending laterally outward from the non-magnetic side gaps, the non-magnetic wing extensions being offset from the leading edge of the write pole;
wherein the trailing edge of the write pole defines a plane and wherein, the non-magnetic trailing gap has a length that defines a trailing gap length and the non-magnetic gap wings are offset from the plane by a distance that is about equal to twice the trailing gap length.

16. A magnetic write head, comprising:

a magnetic write pole having a trailing edge, a leading edge and first and second laterally opposed sides each extending from the leading edge to the trailing edge; and a magnetic shield separated from each of the first and second laterally opposed sides of the magnetic write pole by first and second non-magnetic side gap layers and separated from the trailing edge of the magnetic write pole by a non-magnetic trailing gap layer; and non-magnetic gap wings extending laterally outward from the non-magnetic side gaps, the non-magnetic wing extensions being offset from the leading edge of the write pole;

wherein the trailing edge of the write pole defines a plane and wherein, the non-magnetic trailing gap has a length of about 20 nm and the non-magnetic gap wings are offset from the plane by a distance of about 20 nm.

17. A magnetic write head, comprising:

a magnetic write pole having a trailing edge, a leading edge and first and second laterally opposed sides each extending from the leading edge to the trailing edge; and a magnetic shield separated from each of the first and second laterally opposed sides of the magnetic write pole by first and second non-magnetic side gap layers and separated from the trailing edge of the magnetic write pole by a non-magnetic trailing gap layer; and non-magnetic gap wings extending laterally outward from the non-magnetic side gaps, the non-magnetic wing extensions being offset from the leading edge of the write pole;

wherein the trailing edge of the write pole defines a plane and wherein, the non-magnetic trailing gap has a length of about 20 nm and the non-magnetic gap wings are offset from the plane by a distance of about 40 nm.

18. A magnetic write head, comprising:

a magnetic write pole having a trailing edge, a leading edge and first and second laterally opposed sides each extending from the leading edge to the trailing edge; and a magnetic shield separated from each of the first and second laterally opposed sides of the magnetic write pole by first and second non-magnetic side gap layers and separated from the trailing edge of the magnetic write pole by a non-magnetic trailing gap layer; and non-magnetic gap wings extending laterally outward from the non-magnetic side gaps, the non-magnetic wing extensions being offset from the leading edge of the write pole;

wherein the non-magnetic wings each have a length of gap that is about equal to a length of the trailing gap.

19. A magnetic write head, comprising:

a magnetic write pole having a trailing edge, a leading edge and first and second laterally opposed sides each extending from the leading edge to the trailing edge; and a magnetic shield separated from each of the first and second laterally opposed sides of the magnetic write pole by first and second non-magnetic side gap layers and separated from the trailing edge of the magnetic write pole by a non-magnetic trailing gap layer:, and non-magnetic gap wings extending laterally outward from the non-magnetic side gaps the non-magnetic wing extensions being offset from the leading edge of the write pole;

wherein the non-magnetic gap wings extend at an angle of about 30 degrees relative to the plane defined by the trailing edge of the write pole.

* * * * *

UNITED STATES PATENT AND TRADEMARK OFFICE
CERTIFICATE OF CORRECTION

| | | |
|---|---|---|
| PATENT NO. | : 8,630,064 B2 | |
| APPLICATION NO. | : 13/294816 | |
| DATED | : January 14, 2014 | |
| INVENTOR(S) | : Maeda et al. | |

It is certified that error appears in the above-identified patent and that said Letters Patent is hereby corrected as shown below:

On the title page, Item (54) and in the specification, col. 1, line 2, Title:

replace "LATTERALLY" with --LATERALLY--

In the specification:

col. 9, line 60 replace "hump" with --bump--;

col. 10, line 10 replace "lavers" with --layers--;

col. 10, line 12 replace "pate" with --pole--;

col. 10, line 30 replace "nonmagnetic" with --non-magnetic--;

col. 10, line 53 replace "edgy" with --edge--;

col. 12, line 25 replace "layer:," with --layer;--.

In the claims:

col. 9, line 58, replace "ahs" with --has--

Signed and Sealed this
Eighth Day of April, 2014

Michelle K. Lee
*Deputy Director of the United States Patent and Trademark Office*